(12) United States Patent
Laycock et al.

(10) Patent No.: US 6,333,391 B1
(45) Date of Patent: Dec. 25, 2001

(54) AQUEOUS POLYIMIDE PROCESS

(75) Inventors: Bronwyn Glenice Laycock, Heidelberg Heights; David Geoffrey Hawthorne, Oakleigh; Jonathan Howard Hodgkin, Burwood; Trevor Charles Morton, Hampton, all of (AU)

(73) Assignees: Commonwealth Scientific and Industrial Research Organisation, Australian Capital Territory (AU); The Boeing Company, Seattle, WA (US)

( * ) Notice: Subject to any disclaimer, the term of this patent is extended or adjusted under 35 U.S.C. 154(b) by 0 days.

(21) Appl. No.: 09/463,610

(22) PCT Filed: May 29, 1998

(86) PCT No.: PCT/AU98/00402

§ 371 Date: Apr. 21, 2000

§ 102(e) Date: Apr. 21, 2000

(87) PCT Pub. No.: WO99/06470

PCT Pub. Date: Feb. 11, 1999

(30) Foreign Application Priority Data

Jul. 30, 1997 (AU) .................................................. PO 8306

(51) Int. Cl.$^7$ .......................... C08G 73/10; C08G 73/14; C08L 79/08

(52) U.S. Cl. .......................... 528/170; 528/125; 528/126; 528/128; 528/171; 528/172; 528/173; 528/174; 528/176; 528/183; 528/185; 528/188; 528/220; 528/229; 528/350; 528/353; 528/351; 524/600; 524/606; 428/394; 428/395; 428/396

(58) Field of Search ..................................... 528/125, 126, 528/128, 171, 172, 173, 174, 176, 183, 185, 188, 220, 229, 350, 351, 353; 524/600, 606; 428/394, 395, 396

(56) References Cited

U.S. PATENT DOCUMENTS

| | | | | |
|---|---|---|---|---|
| 4,495,342 | * | 1/1985 | Landis | 528/125 |
| 4,496,711 | * | 1/1985 | Landis | 528/125 |
| 4,496,794 | * | 1/1985 | Darms et al. | 528/125 |
| 5,104,967 | * | 4/1992 | Sheppard et al. | 528/322 |
| 5,104,968 | * | 4/1992 | Gonzalez et al. | 528/322 |
| 5,116,935 | * | 5/1992 | Lubowitz et al. | 528/173 |
| 5,147,966 | * | 9/1992 | St. Clair et al. | 528/188 |
| 5,202,411 | * | 4/1993 | Itatani | 528/353 |

FOREIGN PATENT DOCUMENTS

| | | |
|---|---|---|
| 60-108464A | 6/1985 | (JP) . |
| 04-023879 | 1/1992 | (JP) . |

* cited by examiner

Primary Examiner—P. Hampton-Hightower
(74) Attorney, Agent, or Firm—Sughrue Mion, PLLC

(57) ABSTRACT

A process for the preparation of an oligomeric polyimide comprises: mixing a tetracarboxylic acid, a dianhydride, a partially hydrolysed dianhydride or a mixture thereof with a diamine in a reaction medium comprising greater than 80% by weight water, and heating mixture in said reaction medium at a temperature above 100° C. for a time sufficient to form said oligomeric polyimide.

40 Claims, No Drawings

AQUEOUS POLYIMIDE PROCESS

BACKGROUND OF THE INVENTION

This invention is concerned with a process for the preparation of polyimide derivatives in water and with polymers, particularly high-temperature-resistant polymers, made therefrom.

Polyimides are synthetic organic resins characterised by repeating imide linkages in the polymer chain which may or may not be end-capped with polymerisable or inert (i.e. non-polymerisable) chemical groups. They are available in both linear and cross-linked forms and are noted for their excellent thermal, mechanical and dielectric properties, such as high glass transition temperature, high thermal decomposition temperature, and high mechanical strength. In addition to their use as matrices for fibre reinforced composites, they may be used as precured films and fibres, curable enamels, laminating resins, adhesives, and for forming molded articles.

The standard method for the synthesis of polyimides involves reacting aromatic diamines with purified dianhydrides and optionally functionalised monoanhydrides in dry and highly purified polar solvents at room temperature. The resulting amic acids are then either heated to above 180° C. or chemically cyclodehydrated to complete the cyclisation and form the imide ring structure.

The solvents chosen for these reactions have typically been those which would dissolve at least one of the reactants and preferably both the anhydrides and the diamines. It is also typically preferred that the solvent should maintain the resulting poly(amic acid) or poly(amic ester) in solution. Since the amines and anhydrides used for these applications are generally highly aromatic and often have limited solubility, the solvents that are chosen usually include N,N-dimethylformamide, N,N-dimethylacetamide, m-cresol, dimethylsulfoxide, N-methyl pyrrolidine, tetramethylurea, and the like. These solvents can be used alone or in combination with other solvents such as benzene, benzonitrile, dioxane, xylene, toluene and cyclohexane (see, for example, U.S. Pat. No. 5,138,028).

However, the use of these organic solvents introduces environmental and safety issues related to the handling and disposal of the solvents, and also issues of solvent cost. Another drawback of this approach is that the high boiling points of many of these solvents, coupled with their tendency to form complexes with the polymer (see, for example, D. Frank-Susich, D. H. Laananen and D. Ruffner, "Cure cycle simulation for thermoset composites" in *Composites Manufacturing*, Vol. 4, No 3, 1993, pp. 139–146), makes removal during processing difficult. This can lead to defects through the formation of voids. The presence of residual solvent may possibly be associated with long-term thermal instability via chemical interactions with the imide functionality. In addition, amide solvents also often contain mono functional amine impurities. These monofunctional amine impurities can compete with the monomeric diamines throughout the polymerisation cycle leading to chain termination. Such reactions can upset the monomer stoichiometry and lead to lower or variable molecular weights and unreactive chain ends.

It would therefore be advantageous for several reasons if these imidisation reactions could be performed in water.

However, since the reactions to form amic acids and imides are reversible, and water is a product of the reaction, it appears that the presence of water in this process would be highly undesirable. It is generally accepted that for the production of high molecular weight poly(amic acids) a major disadvantage of the dianhydride/diamine route is the extreme moisture sensitivity of the initial stage since trace amounts of water may rapidly hydrolyse the dianhydride monomer and poly(amic acid), preventing the attainment of high molecular weight poly(amic acid). Also since the aromatic reactants are generally at the most only partially soluble in water, and are often totally insoluble, it would seem to be unlikely that any reaction between the anhydride and amine components should occur readily or to completion.

Despite this, it has now been surprisingly found that water can be used as the reaction medium in a process for forming oligomeric polyimides.

There are examples of aromatic poly(amic acids) being synthesised in water or mixed water/organic solvents (see, for example, J. Ookawa et al; Japanese Patent 95-139436, 1995; H. Nomura and T. Goto, Japanese Patent 94-144623, 1994; H. Nishizawa et al, Japanese Patent 87-4296, 1992). However, in all cases where water alone is used as a solvent, a less reactive amine or nitrogenous base, such as a secondary or tertiary amine or pyridine, has been added to stabilise the resulting amic acid and to aid its dissolution, notionally through the formation of a salt at the free carboxylic acid functionality. A recent variant on this procedure (J. V. Facinelli et al, Macromolecules, 1996, Vol 29, pp. 7342–7350) was to generate the poly(amic acid) salts from preferred poly(amic acids) in an organic solvent such as NMP or THF. The solvent mixture, including water, was in all cases removed from these poly(amic acid) salt solutions, by drying, before imidisation.

These methods suffer from a disadvantage in that, when water is used as a solvent alone, there is a byproduct formed in the imidisation reaction—the basic counterion which was used to produce the amic acid salt—which may not be completely removed. If mixed aqueous/organic solvents are used, there will also still be the disadvantage that organic solvents will be introduced which may also be difficult to completely remove. Also, the fact that the procedures require drying of the intermediate amic acid salts before the imidisation process begins is a further disadvantage in that a separate stage of processing is required.

Two procedures exist in which an imide is formed in an aqueous solvent. In one process, diaminobisimides are prepared in water upon heating to between 120° C. and 200° C. (J. H. Hodgkin et al in Australian Patent 647,537). However, this example is only of the formation of a monomeric diaminobisimide with only two imide formation steps, and the insolubility of the resulting product is an advantage in this case as it is required that further reaction be prevented. Further, for the same reason it was required that there be either good conjugation between the nitrogen atoms of the aromatic diamine, or that steric or other restrictions capable of moderating reactivity of the unreacted amine moiety were present, to limit the number of imide formation steps to that of the monomer required. Likewise, in the second example (U.S. Pat. No. 5,264,588) the objective of the synthesis was the formation of a monoimide, chloro-N-phenylphthalimide. The procedure required that a chlorophthalic acid compound and aniline were heated in water to between 95° C. and 105° C. to give the monoimide product which precipitated out on cooling.

It is therefore an unexpected result that polyimides, as opposed to monomeric mono- or diimides of low molecular weight, may also be formed in water. This is particularly true given that the insolubility of the reagents in water mean that many complex imide formation reactions must occur in products which are insoluble and in an environment which should in theory promote the reverse process.

SUMMARY OF THE INVENTION

Therefore this invention provides a process whereby polyimides, in particular oligomeric polyimides, may be formed from amines and carboxylic acids or anhydrides, in water.

According to one aspect of the present invention there is provided a process for the preparation of an oligomeric polyimide comprising:

mixing a tetracarboxylic acid, a dianhydride, a partially hydrolysed dianhydride or a mixture thereof with a diamine in a reaction medium comprising greater than 80% by weight water, and heating mixture in said reaction medium at a temperature above 100° C. for a time sufficient to form said oligomeric polyimide.

DETAILED DESCRIPTION OF THE INVENTION

The term "tetracarboxylic acid" as used herein refers to an organic compound having at least four carboxylic acid groups, two pairs of which are capable of forming cyclic imide functionalities. The term also refers to and includes salts of such tetracarboxylic acids. An imide functionality refers to two acyl groups attached to the same nitrogen. Examples of suitable tetracarboxylic acids include those of formula (I):

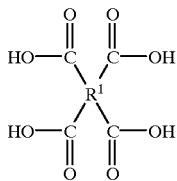

(I)

where $R^1$ is selected from optionally substituted alkyl, optionally substituted aryl and optionally substituted bridged or bonded di- or poly-aryl.

The term "dianhydride" as used herein refers to an organic compound having at least two anhydride groups. Examples of suitable dianhydrides include those of formula II:

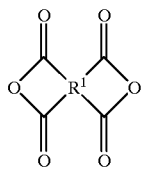

II where $R^1$ is as defined above.

The term "partially hydrolysed dianhydride" refers to a dianhydride as defined above in which one of the anhydride groups has undergone hydrolysis. The term also refers to organic compounds having an anhydride group and two carboxylic acid groups capable of condensing to form an anhydride group, as well as salts of such carboxylic acid groups.

The medium for the reaction is water, optionally together with minor amounts of cosolvents, such as water miscible alcohols, glycols, or ethers etc., e.g. ethanol, dioxane, tetrahydrofuran, oligoethylene oxides and ethylene glycol ethers. The reaction medium may also contain other additives such as inorganic acids, inorganic bases, salts of inorganic cations and surfactants. The amount of cosolvents and other additives should not exceed 20%. Preferably the reaction medium contains less than 10% by weight cosolvents and other additives, more preferably less than 5% by weight cosolvents and other additives, and most preferably the reaction medium is substantially free of cosolvents and other additives. To obtain high molecular weight products it is preferred to select a reaction medium which allows the growing oligomeric polyimide product to remain in solution at the reaction temperature and pressure to a greater extent. It is also to be understood that the reaction medium of the heating step need not be derived from the reaction medium of the mixing step, although both reaction mediums should comprise greater than 80% water.

As used herein the term "aryl" refers to aromatic carbocyclic, aromatic heterocyclic and pseudo aromatic moieties, preferably containing between 5 and 20 ring atoms. The moieties may be mono or polycyclic. Examples of suitable aryl moieties include those derived from benzene, naphthalene, anthracene, phenanthracene, carbazole indene, pyrene, pyridine, pyrazine, indole, isoquinoline, naphthyridine, xanthene, acridine, phenanthroline, phenazine and the like, each of which may be optionally substituted. The term "pseudoaromatic" refers to a ring system which is not strictly aromatic, but which is stabilized by means of delocalisation of the π electrons and behaves in a similar manner to aromatic rings. Examples of pseudo aromatic moieties include furan, thiophene, pyrrol and the like.

As used herein the term "bridged or bonded di- or poly-aryl" refers to two or more aryl groups joined by a bond or a bridging group. Examples of such groups include biphenyl, phenoxybenzene, diphenylketone, sulphonyldiphenyl and the like.

The term "bridging group" as used herein refers to a divalent group connecting two aryl groups. Examples of suitable bridging groups include —CO—, —CO$_2$—, —CONH—, —SO$_2$—, —SO—, —O—, —S—, —S—S—, —(CH$_2$)$_m$— where m is 1 to 4, —CH(OH)—, —C(CF$_3$)$_2$—, —C(CH$_3$)$_3$—, —PR(O)— or —PO$_3$R—,

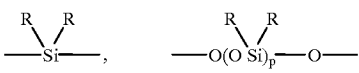

where q is 1 to 25,

or

where q is 1 to 10, or a group of the formula —(X)$_n$L(Y)$_o$— where L is an optionally substituted aryl group, X and Y are independently selected from O, S, —CH$_2$—, —SO$_2$— and —CO—, and n and or are independently 0 or 1, where each R is independently selected from optionally substituted alkyl or optionally substituted aryl.

The term "diamine" as used herein refers to an organic compound having at least two primary amine groups. Examples of suitable diamines include those of formula III:

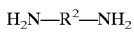

III where $R^2$ is selected from optionally substituted alkylene, optionally substituted siloxane, optionally substituted arylene and optionally substituted bridged or bonded di- or polyaryl.

Preferred $R^2$ groups include

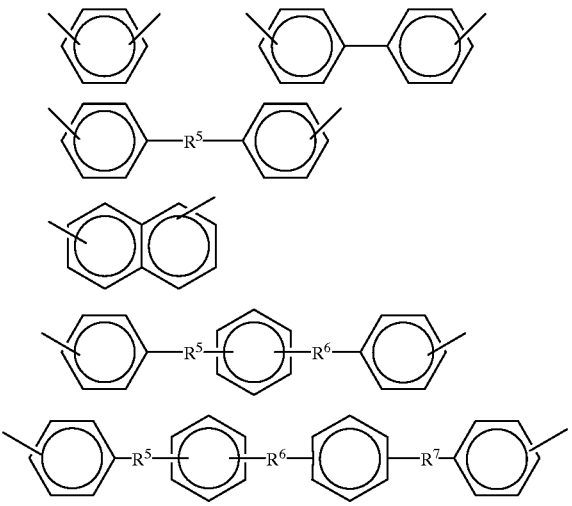

wherein $R^5$, $R^6$ and $R^7$ are independently selected from divalent bridging groups such as

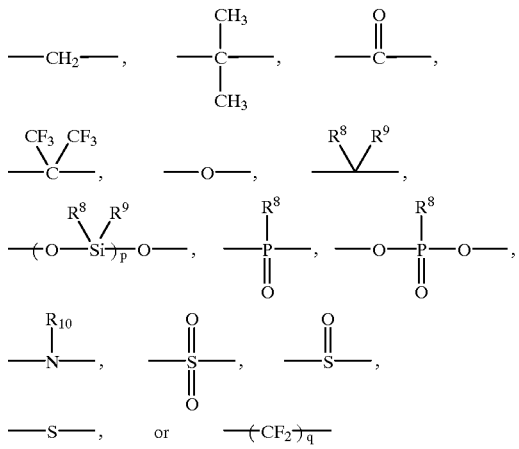

wherein $R^8$ and $R^9$ are independently alkyl or aryl, $R^{10}$ is $R^8$ or H, q is 1 to 10, and p is 1 to 25.

Preferred diamines include: meta-phenylene diamine; 2,2-bis(4-aminophenyl) propane; 4,4'-diamino diphenyl methane; 4,4'-diamino diphenyl sulfide; 4,4'-diamino diphenyl sulfone; 3,3'-diamino-diphenyl sulfone; 4,4'-oxydianiline; bis-(4-aminophenyl) diethylsilane; bis-(4-aminophenyl) diphenylsilane; 3,3'-dichlorobenzidine; 3,3'-dimethoxy benzidine; bis-(4-aminophenyl) ethyl phosphine oxide; bis-(4-aminophenyl) phenyl phosphine oxide; bis-(4-aminophenyl)-n-butylamine; bis-(4-aminophenyl) methylamine; 1,5-diamino naphthalene; 3,3-dimethyl-4,4'-diaminobiphenyl; N-(3-aminophenyl)-4-aminobenzamnide; 4-aminophenyl-3-aminobenzoate; bisaniline M-(4,4'-[1,3-phenylene bis(1-methylethylidene)]-bis(benzenamine); bisaniline P (4,4'-[1,4-phenylene bis(1-methyethylidene)]-bis(benzenamine); 3,3'-diaminobenzophenone; 2,2-bis(3-amino- 4-methylphenyl)hexafluoropropane; 4,4'-bis(4-aminophenoxy)biphenyl; and mixtures thereof.

A given $R^1$ or $R^2$ group may contain a mixture of bridging groups.

The term "oligomeric polyimide" as used herein refers to a polymer containing repeating imide functionalities. Examples of the types of oligomeric polyimides which can be prepared in accordance with the present invention include those of formula IV:

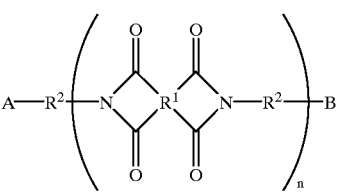

IV wherein $R^1$ and $R^2$ are as defined above, n is greater than 1, and A and B may be the same or different and represent suitable end groups.

Suitable end groups include

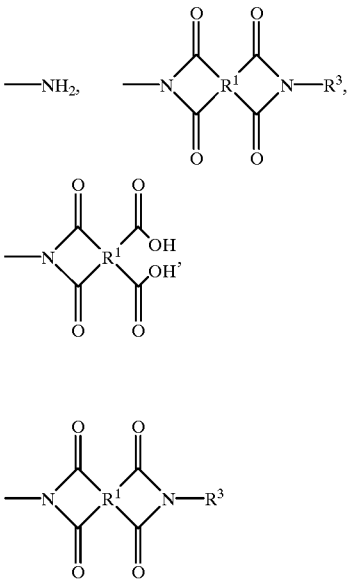

where $R^3$ is a monovalent organic radical, or an imidic structure:

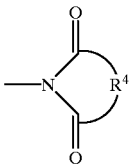

where $R^4$ is a divalent organic radical.

Examples of suitable monovalent organic radicals include optionally substituted alkyl, optionally substituted alkenyl, optionally substituted alkynyl, optionally substituted aryl, optionally substituted bridged or bonded di or polyaryl, optionally substituted alkoxy, optionally substituted alkenyloxy, and optionally substituted alkynyloxy.

Examples of suitable divalent organic radicals include optionally substituted alkynyl, optionally substituted alkenylene, optionally substituted arylene and optionally substituted bridged or bonded di or polyaryl.

Some examples of suitable imidic structures include:

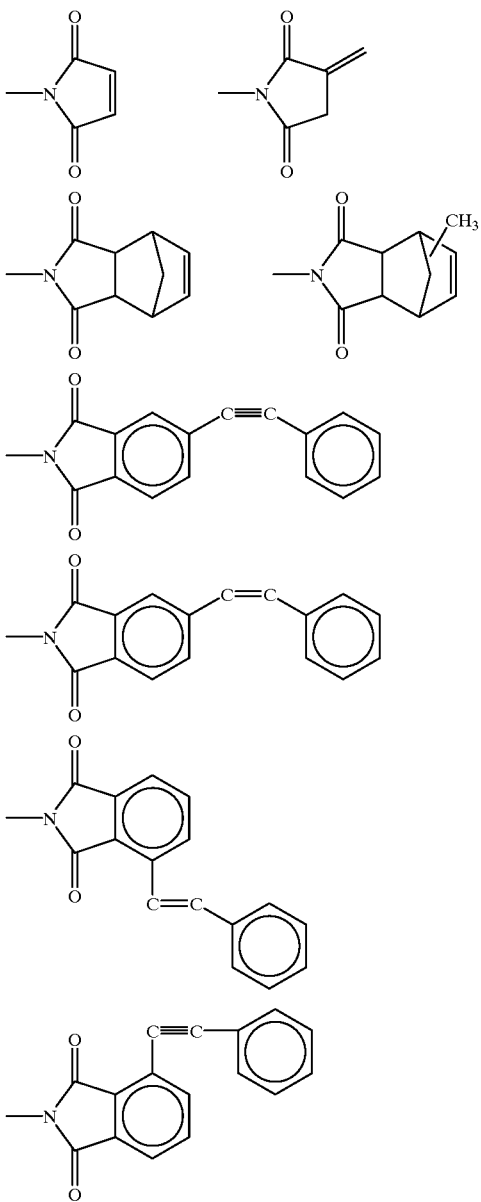

Examples of suitable reactive imidic end-groups include

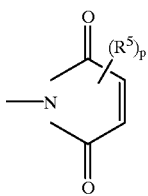

where each $R^5$ is the same or different and is selected from optionally substituted $C_1$–$C_6$ alkyl, optionally substituted $C_2$–$C_6$ alkene, optionally substituted $C_2$–$C_6$ alkyne, $C_1$–$C_6$ alkoxy, optionally substituted aryl or aryloxy and p is 0, 1 or 2.

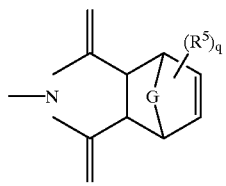

where $R^5$ is as defined above, G is O, S, —$SO_2$—, —SO, —CO—, —S—S—, or optionally substituted methylene, and q is 0, 1, 2, 3 or 4;

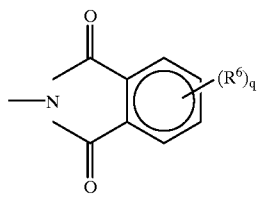

where q is as defined above and $R^6$ is the same or different and is selected from optionally substituted $C_1$–$C_6$ alkyl, optionally substituted $C_2$–$C_6$ alkene, optionally substituted $C_2$–$C_6$ alkyne, $C_1$–$C_6$ alkoxy, optionally substituted aryl or aryloxy, optionally substituted bridged bonded di or polyaryl;

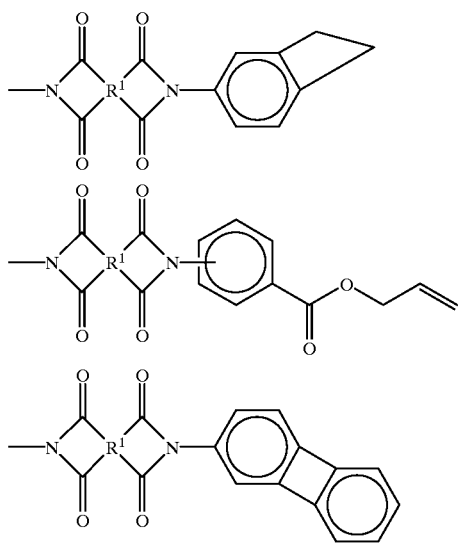

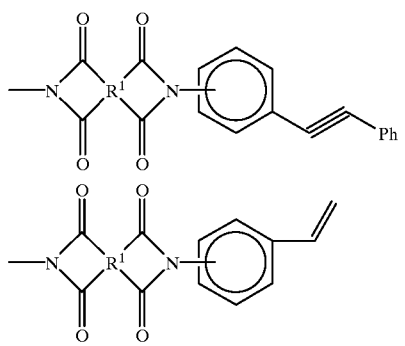

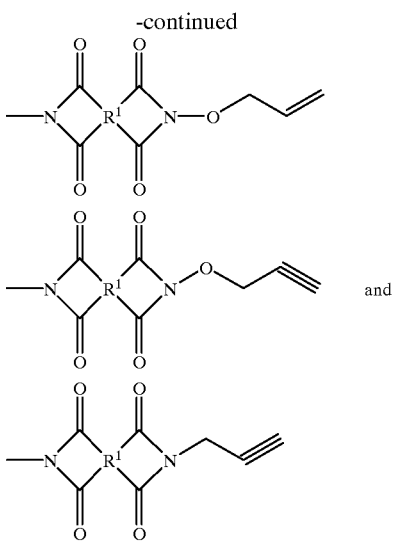

and

Polyimides with amine end groups may be obtained by reacting the tetracarboxylic acid or dianhydride with an excess of diamine. The amine end functionalities may be "capped" by reaction with an appropriate capping compound so as to obtain end groups such as those described above. These capping compounds will generally contain a diacid or anhydride functionality capable of reacting with the amine to form an imide linkage. These capping compounds may be added to the mixture during the mixing stage or the heating stage, or may be added after formation of the amine terminated polyimide is complete.

Polyimides with terminal acid or anhydride functionalities may be found by reacting the diamine with an excess of tetracarboxylic acid or anhydride. These functionalities may be capped by reaction with appropriate amines to obtain end groups such as those described above. The amine may be added during the mixing or reaction stages or may be added after formation of the acid/anhydride-terminal polyimide is complete.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, isocyano, cyano, formyl, carboxyl, nitro, nitroalkyl, nitroalkenyl, nitroalkynyl, nitroaryl, nitroheterocyclyl, amino, alkylaamino, dialkylamino, alkenylamino, alkynylamino, arylamino, diarylamino, benzylamino, imino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphenyl, arylsulphenyl, carboalkoxy, carboaryloxy mercapto, alkylthio, benzylthio, acylthio, sulphonamido, sulfanyl, sulfo and phosphorus-containing groups.

In the above definitions, the term "alkyl", used either alone or in compound words such as "alkylene", "alkenyloxyalkyl", "alkylthio", "alkylamino" and "dialkylamino" denotes straight chain, branched or cyclic alkyl, preferably $C_{1-20}$ alkyl or cycloalkyl. Examples of straight chain and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2,-trimethylpropyl, 1,1,2-trimethylpropyl, heptyl, 5-methoxyhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3,-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2- or 3- propylhexyl, decyl, 1-, 2-, 3-, 4-, 5-, 6-, 7- and 8-methylnonyl, 1-, 2-, 3-, 4-, 5- or 6-ethyloctyl 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propylocytl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7-, or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like.

The term "alkoxy" denotes straight chain or branched alkoxy, preferably $C_{1-20}$ alkoxy. Examples of alkoxy include methoxy, ethoxy, n-propoxy, isopropoxy and the different butoxy isomers.

The term "alkenyl" denotes groups formed from straight chain, branched or cyclic alkenes including ethylenically mono-, di- or poly-unsaturated alkyl or cycloalkyl groups as previously defined, preferably $C_{2-20}$ alkenyl. Examples of alkenyl include vinyl, allyl, 1-methylvinyl, butenyl, isobutenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1-4,pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl.

The term "alkynyl" denotes groups formed from straight chain, branched or cyclic alkyne including alkyl and cycloalkyl groups as previously defined which contain a triple bond, preferably $C_{2-20}$ alkynyl. Examples of alkynyl include ethynyl, 2,3-propynyl and 2,3- or 3,4-butynyl.

The term "acyl" either alone or in compound words such as "acyloxy", "acylthio", "acylamino" or "diacylamino" denotes carbamoyl, aliphatic acyl group and acyl group containing an aromatic ring, which is referred to as aromatic acyl, or an acyl group containing a heterocyclic ring which is referred to as heterocyclic acyl. Preferably the acyl group has 1 to 20 carbon atoms. Examples of acyl include carbamoyl; straight chain or branched alkanoyl such as formyl, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; alkoxycarbonyl such as methoxycarbonyl, ethoxycarbonyl, t-butoxycarbonyl, t-pentyloxycarbonyl and heptyloxycarbonyl; cycloalkylcarbonyl such as cyclopropylcarbonyl, cyclobutylcarbonyl, cyclopentylcarbonyl and cyclohexylcarbonyl; alkylsulfonyl such as methylsulfonyl and ethylsulfonyl; alkoxysulfonyl such as methoxysulfonyl and ethoxysulfonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aralkoxycarbonyl such as phenylalkoxycarbonyl (e.g. benzyloxycarbonyl); aryloxycarbonyl such as phenoxycarbonyl and napthyloxycarbonyl; aryloxyalkanoyl such as phenoxyacetyl and phenoxypropionyl; arylcarbamoyl such as phenylcarbamoyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolylglyoxyloyl and thienylglyoxyloyl.

The terms "heterocyclic", "heterocyclyl" and "heterocycl" as used herein on their own or as part of a group such as "heterocyclicalkenoyl", "heterocycloxy" or "haloheterocyclyl" refer to aromatic, pseudo-aromatic and non-aromatic rings or ring systems which contain one or more heteroatoms selected from N, S, O and P and which may be optionally substituted. Preferably the rings or ring systems have 3 to 20 carbon atoms. The rings or ring systems may be selected from those described above in relation to the definition of "aryl".

While not wishing to be limited by any one explanation of the mechanism of the process of this invention, it is believed that the process for the production of oligomeric polyimides relies on the formation in water of an initial complex between one or more aromatic diamines and one or more polycarboxylic acids and/or polycarboxylic acid dianhydrides and/or the reaction products of these with water. This complex may be formed and isolated in a separate step prior to use for polyimide formation, or formed in situ as part of a one-pot process.

The ratio of the number of moles of $NH_2$ groups to the number of moles of C=O derived from carboxylic acids or carboxylic acid anhydrides in the total mix of reagents should be about 1:2, unless acid or amino end-groups are required, in which case the appropriate reagent should be in excess of that required for 1:2.

The reactants may be mixed together with the water at any suitable temperature. Hydrolysis and solubilization of anhydride component is aided by higher temperature, and accordingly it is preferable to heat the water to greater than 60° C., more preferably greater than 75° C., and most preferably to boiling temperature, during mixing. In a preferred embodiment the mixture is heated under reflux to assist in mixing. In an alternative embodiment the reactants can be added to a pressurized reactor and heated at temperatures above the normal boiling point of water, so mixing and reacting to form the polyimide occurs in the same vessel.

It is preferable to dissolve/hydrolyze the acid/anhydride component in the aqueous reaction medium before adding the amine component. This may be carried out at temperatures in the range of from 20 to 100° C. Preferably a suspension or solution of a diamine or a mixture of diamines in water, optionally with additives to up to 20% by weight is separately prepared. This suspension or solution, preferably at temperatures ranging from 20 to 100° C., is then added to the carboxylic acid or anhydride component mixture in water. The solid intermediate product which results can then either be isolated, eg.by filtration or reacted further in the suspension or slurry in which it is formed.

The final cyclisation of this intermediate product to produce a polyimide oligomer may be carried out by heating, preferably between 100° C. and 250° C., more preferably between 120 to 200° C., a solution or slurry of the intermediate product as formed in water, or a solution or slurry of the dry or moist, filtered solid intermediate in water, optionally under pressure, and also optionally under nitrogen, preferably at pressures in the range of from 30 to 200 psi.

The time required to form the polyimide will depend on the nature of the reactants, and the temperature and pressure at which the reaction is conducted. The time required under the conditions employed can be readily determined by a person skilled in the art. The formation of the polyimide will generally be characterized by the formation of a coloured solid which is insoluble in the aqueous reaction medium.

The functionalised imide oligomers produced by means of the process of this invention can be polymerised thermally with or without an appropriate catalyst and with or without a co-reactant.

According to a still further aspect of this invention there is provided a curable composition containing imide oligomers prepared in the manner described above, optionally with other monomers or oligomers which undergo polymerisation by thermal or catalytic means.

The curable compositions of the present invention are particularly useful in the manufacture of fibre-reinforced composite materials.

For example, the curable compositions of the invention may be applied to reinforcing fibres, especially carbon fibres, either from solution (preferably in a lower aliphatic ketone or halogenated hydrocarbon solvent), from a hot melt, or by powder coating.

In another aspect, the present invention provides an impregnated fibre reinforced material (commonly known as a "prepreg") characterised in that the fibre reinforcements are impregnated with a curable compositions defined above.

The impregnated fibre materials can be laid down by any suitable method known in the art for making composite materials such as, for example, vacuum bagging or a caul plate or an appropriate tool. The impregnated fibre reinforced materials are suitable for use in the production of advanced composite materials. The resulting composite article may be cured by conventional methods.

Thus, in a further aspect, the present invention provides a composite material comprising a fibrous material in a matrix of a cured resin compositions in accordance with the invention defined above.

Alternatively, the compounds of the invention can be used in an appropriate resin formulation for resin transfer molding or for the manufacture of sheet molded material. Another envisaged application is in pultrusion or in the formation of films, used for example in gas separation processes.

The invention is illustrated by the following non-limiting examples. In the descriptions given below, the systematic names when given are based on Chemical Abstracts names of related compounds. However, because of the difficulty of systematically naming these chemical structures, names given are not to be taken as limiting the chemical structure of the materials claimed in this Patent.

EXAMPLES

Example 1

A mixture of 2.524 g of 3,3',4,4'-biphenyltetracarboxylic acid dianhydride (symmetrical biphenyldianhydride, s-BPDA) and 0.277 g of 1,2-benzene dicarboxylic acid anhydride (phthalic anhydride) was placed in a 100 mL round-bottomed flask equipped with stirrer-bar and condenser. To the solids was added 50 mls of distilled water. This mixture was heated to 80° C. with stirring. After heating for 15 minutes, a suspension of 1.622 g of 3-(4-aminophenoxy)benzenamine (3,4'-ODA) and 0.420 g of 1,3-bis(4-aminophenoxy)benzene (TPE-R) in 20 mls water was added. The beige coloured precipitate and the solvent residue were transferred to a PTFE lined pressure vessel (a 300 mL Parr reactor). After flushing the system thoroughly with nitrogen, the mixture was heated with stirring to 135° C. for 90 minutes, then to 180° C. for 150 minutes. The pressure in the latter stage of the reaction was 120 psi. After cooling overnight, the solid yellow residue was collected, ground and thoroughly washed with water.

The reduced viscosity of the product after drying at 220° C./0. 1 mm Hg for 20 minutes was 0.210 (1% solution in m-cresol at 30° C.). The FTIR spectrum was comparable with that of the product made in organic solvent (IR (KBr): 1774 $cm^{-1}$ (imide C=O), 1710 $cm^{-1}$ (imide C=O), 1506$^{-1}$, 1486 $cm^{-1}$, 1370 $cm^{-1}$, 1235 $cm^{-1}$, 1088 $cm^{-1}$, 834 $cm^{-1}$ and 736 $cm^{-1}$). A transition at approx. 373° C. was observed using differential scanning calorimetry (DSC) on heating a sealed sample at a rate of 10° C./minute.

Example 2

A mixture of s-BPDA (2.525 g) and phthalic anhydride (0.279 g) was refluxed in 60 mls of water for 90 minutes. A mixture of TPE-R (0.420 g) and 3,4'-ODA (1.623 g) was then dissolved in 4 mls of ethylene glycol dimethyl ether (EGDME). To this was added 20 mls of water. A portion of the milky-white aqueous basic mixture was then added to the host aqueous acidic suspension. An immediate white precipitate was obtained. An extra 2 mls of BGDME was then added to the remaining amine mixture and the residue dissolved and transferred to the hot reaction mix. The white product was filtered off under vacuum and washed with cold water (2×100 mls). The white filter cake was then transferred to a PTFE lined pressure vessel. To this was added 60 ml of water, to produce a fine slurry. After flushing with nitrogen, the vessel was then heated to 135° C. for 60 minutes. The temperature was then raised to 180° C. for 3 hrs, and the mixture allowed to cool overnight. The yellow solid was ground and washed thoroughly with water.

The reduced viscosity of the product after drying at 220° C./0.1 mm Hg for 20 minutes was 0.555 (1% solution in m-cresol at 30° C.). The FTIR spectrum was comparable with that of the product made in organic solvent (IR (KBr) 1776 $cm^{-1}$ (imide C=O), 1713 $cm^{-1}$ (imide C=O), 1506 $cm^{-1}$, 1368 $cm^{-1}$ 1236 $cm^{-1}$, 1088 $cm^{-1}$, 831 $cm^{-1}$ and 750 730 $cm^{-1}$). A transition at approx. 365° C. was observed using differential scanning calorimetry (DSC) on heating a sealed pan containing sample at a rate of 10° C./minute.

Example 3

To a mixture of s-BPDA (2.525 g) and phthalic anhydride (0.279 g) in 50 mls of distilled water was added 0.419 g of solid sodium hydroxide. This mixture was then refluxed for 30 minutes. A separate mix of TPE-R (0.420 g) and 3,4'-ODA (1.623 g) was suspended in 30 mls of distilled water and to this was added 0.95 mls of concentrated hydrochloric acid. The resulting product, consisting of fine solids suspended in a brown solution, was then added to the hot aqueous mixture derived from the anhydrides. An immediate pure white precipitate formed. This was collected and washed with water before being transferred to a PTFE lined pressure vessel. To this white cake was then added 50 mls of water, making a fine slurry. After flushing the pressure vessel with nitrogen, this was then heated with stirring to 135° C. for 60 minutes and then to 180° C. for a further 3 hrs. After cooling overnight, the resulting yellow solid was ground and washed thoroughly with water.

The reduced viscosity of the product after drying at 220° C./0.1 mm Hg for 20 minutes was 0.379 (1% solution in mcresol at 30° C.). The yield was 3.32 g (80%). The FTIR spectrum was comparable with that of the product made in organic solvent (IR (KBr) 1775 $cm^{-1}$ (imide C=O), 1713 $cm^{-1}$ (imide C=O), approx. 1502 $cm^{-1}$, 1367 $cm^{-1}$, 1229 $cm^{-1}$, 1087 $cm^{-1}$, 831 $cm^{-1}$ and 733 $cm^{-1}$). A transition at approx. 365° C. was observed using differential scanning calorimetry (DSC) on heating a sealed pan containing sample at a rate of 10° C./minute.

Example 4

A mixture of s-BPDA (2.525 g) and phthalic anhydride (0.280 g) was placed in a round-bottomed flask. In a separate beaker, 3.289 g of the surfactant Teric® 12A9 from ICI Australia (a C12–C15 alkyl/polyether of Mn=603) was heated in 50 mls of distilled water. The partially solubilised product was transferred to the reaction vessel, and rinsed with a further 30 mls of water. The reaction mix was then heated to reflux for 60 minutes. A separate mix of TPE-R (0.420 g) and 3,4'-ODA (1.624 g) was prepared and some of the supernatant from the reaction vessel was used to transfer the solids across. The coarse brownish granules that formed were then washed very thoroughly with water and the residue transferred to a PTFE lined pressure vessel. To this solid was added 50 mls of water and the vessel flushed with nitrogen. This was then heated with stirring to 135° C. for 90 minutes and then to 180° C. for a further 3 hrs. After cooling overnight, the resulting yellow solid was ground and washed thoroughly with water.

The reduced viscosity of the product after drying at 220° C./0.1 mm Hg for 20 minutes was 0.549 (1% solution in m-cresol at 30° C.). The FTIR spectrum was comparable with that of the product made in organic solvent (IR (KBr) 1776 $cm^{-1}$ (imide C=O), 1717 $cm^{-1}$ (imide C=O), 1594 $cm^{-1}$, 1507 $cm^{-1}$, 1368 $cm^{-1}$, 1233 $cm^{-1}$, 1091 $cm^{-1}$, 833 $cm^{-1}$ and 734 $cm^{-1}$).

Example 5

To a mixture of s-BPDA (2.000 g) and 4-(phenylethynyl)-1,2-benzenedicarboxylic acid anhydride (PEPA) (0.376 g) in 24 mls of degassed distilled water under argon was added 15.9 mls of 0.952 M NaOH. This mixture was then refluxed for 60 minutes under argon. In a separate round-bottomed flask under argon was placed a mix of TPE-R (0.332 g) and 3,4'-ODA (1.285 g) which was then suspended in 2.5 mls of degassed distilled water. To this was added 12.5 mls of 1.208 M HCl, and the mixture was stirred until the solids had dissolved. The product mixture from the reaction of the anhydrides with water was then transferred to a PTFE lined pressure vessel under a stream of argon. To this was then added the amine mixture, also under a stream of argon. An immediate fine grey-white precipitate formed. The round-bottomed flask was then rinsed with 4 mls of water, which was also placed in the pressure vessel. After flushing the pressure vessel with argon, it was then heated with stirring to 135° C. for 60 minutes and then to 180° C. for a further 2 hrs. After cooling overnight, the resulting non-uniform yellow solid was ground and washed thoroughly with boiling water, methanol and acetone.

The reduced viscosity of the product after drying at 220° C./0.1 mm Hg for 20 minutes was 0.264 (1% solution in m-cresol at 30° C.). The yield was 3.189 g (92.5%). The FTIR spectrum was comparable with that of the product made in organic solvent (IR (KBr) 2209 cm$^{-1}$ (alkyne), 1774 cm$^{-1}$ (imide C=O), 1715 cm$^{-1}$ (imide C=O), 1591 cm$^{-1}$, 1505 cm$^{-1}$, 1484 cm$^{-1}$, 1366 cm$^{-1}$, 1227 cm$^{-1}$, 1086 cm$^{-1}$, 833 cm$^{-1}$ and 735 cm$^{-1}$. A transition at approx. 427° C. was observed using differential scanning calorimetry (DSC) on heating a sealed pan containing sample at a rate of 10° C./minute.

Example 6

A mixture of s-BPDA (2.500 g) and PEPA (0.468 g) was refluxed in 50 mls of water under argon for 70 minutes. A mixture of TPE-R (0.414 g) and 3,4'-ODA (1.607 g) was then dissolved in 3 mls of ethylene glycol dimethyl ether (EGDME). This solution was transferred to the hot reaction mixture. An extra 1 ml of EGDME was then added to the remaining amine mixture and the residue dissolved and transferred across. The precipitate that formed was a mixture of coarse brown/beige solid and finer white precipitate. The product was filtered off under vacuum and washed with cold water (2×30 mls). The filter cake was then transferred across to a PTFE lined pressure vessel. To this was added 50 ml of water, to produce a fine slurry. After flushing with nitrogen, the vessel was then heated to 135° C. for 60 minutes. The temperature was then raised to 180° C. for 3 hrs, reaching 160 psi, and the mixture was then allowed to cool overnight. The resulting yellow solid was ground and washed thoroughly with water.

The reduced viscosity of the product after drying at 220° C./0.1 mm Hg for 20 minutes was 0.287 (1% solution in m-cresol at 30° C.). The yield was 3.97 g (92%). The FTIR spectrum was comparable with that of the product made in organic solvent (IR (KBr) 1776 cm$^{-1}$ (imide C=O), 1713 cm$^{-1}$ (imide C=O), 1597 cm$^{-1}$, 1506 cm$^{-1}$, 1486 cm$^{-1}$, 1366 cm$^{-1}$, 1230 cm$^{-1}$, 1086 cm$^{-1}$, 833 cm$^{-1}$ and 733 cm$^{-1}$). A transition at approx. 389° C. was observed using differential scanning calorimetry (DSC) on heating a sealed pan containing sample at a rate of 10° C./minute.

Example 7

To a mixture of s-BPDA (2.001 g) and PEPA (0.375 g) in 16 mls of degassed distilled water under argon was added 0.883 g of NaCl. This mixture was then refluxed for 60 minutes under argon. In a separate round-bottomed flask under argon was placed a mix of TPE-R (0.331 g) and 3,4'-ODA (1.286 g) which was then suspended in 12.5 mls of degassed distilled water. To this was added 0.883 g of NaCl, and the mixture was stirred until the solids had dissolved or were in a fine suspension. The product mixture from the reaction of the anhydrides with water was then transferred to a PTFE lined pressure vessel under a stream of argon. To this was then added the amine mixture, also under a stream of argon. An immediate fine grey-white precipitate formed. The round-bottomed flask was then rinsed with 4 mls of water, which was also placed in the pressure vessel. After flushing the pressure vessel with argon, it was then heated with stirring to 135° C. for 60 minutes and then to 180° C. for a further 2 hrs. After cooling overnight, the resulting non-uniform yellow solid was ground and washed thoroughly with boiling water, methanol and acetone.

The reduced viscosity of the product after drying at 220° C./0.1 mm Hg for 20 minutes was 0.239 (1% solution in m-cresol at 30° C.). The yield was 2.865 g (83.1%). The FTIR spectrum was comparable with that of the product made in organic solvent (IR (KBr) 2210 cm$^{-1}$ (alkyne), 1775 cm$^{-1}$ (imide C=O), 1715 crm$^1$ (imide C=O), 1592 cm$^{-1}$, 1506 cm$^{-1}$, 1487 cm$^{-1}$, 1367 cm$^{-1}$, 1230 cm$^{-1}$, 1087 cm$^{-1}$, 835 cm$^{-1}$ and 735 cm$^{-1}$). A transition at approx. 426° C. was observed using differential scanning calorimetry (DSC) on heating a sealed pan containing sample at a rate of 10° C./minute.

Example 8

A mixture of s-BPDA (2.000 g) and PEPA (0.375 g) was placed in 20 mls of degassed distilled water under argon, and then refluxed for 60 minutes. In a separate round-bottomed flask under argon was placed a mix of TPE-R (0.331 g) and 3,4'-ODA (1.286 g) which was then suspended in 15 mls of degassed distilled water. The mixture was stirred until the solids had dissolved or were in a fine suspension. The product mixture from the reaction of the anhydrides with water was then transferred to a PTFE lined pressure vessel under a stream of argon. To this was then added the amine mixture, also under a stream of argon. An immediate fine grey-white precipitate formed. The round-bottomed flask was then rinsed with 10 mls of water, which was also placed in the pressure vessel. After flushing the pressure vessel with argon, it was then heated with stirring to 135° C. for 60 minutes and then to 180° C. for a further 2 hrs. After cooling overnight, the resulting non-uniform yellow solid was ground and washed thoroughly with boiling water, methanol and acetone.

The reduced viscosity of the product after drying at 220° C./0.1 mm Hg for 20 minutes was 0.234 (1% solution in m-cresol at 30° C.). The yield was 3.271 g (94.9%). The FTIR spectrum was comparable with that of the product made in organic solvent (IR (KBr) 2210 cm$^{-1}$ (alkyne), 1775 cm$^{-1}$ (imide C=O), 1715 cm$^{-1}$ (imide C=O), 1592 cm$^{-1}$, 1506 cm$^{-1}$, 1487 cm$^{-1}$, 1367 cm$^{-1}$, 1230 cm$^{-1}$, 1087 cm$^{-1}$, 834 cm$^{-1}$ and 735 cm$^{-1}$). A transition at approx. 396° C. was observed using differential scanning calorimetry (DSC) on heating a sealed pan containing sample at a rate of 10° C./minute.

Example 9

To a mixture of PEPA (0.626 g) and the 2,2-bis[4-(3,4-dicarboxyphenoxy)phenyl]propane dianhydride (Ultem® dianhydride) (2.500 g) in 50 mls of distilled water was added 0.486 g of solid sodium hydroxide. This mixture was then refluxed for 90 minutes under argon. A separate mix of 3-[(3-aminophenyl)sulphonyl]-benzenamine (3,3'-DDS) (0.577 g) and 3,4'-ODA (0.697 g) was then suspended in 40 mls of distilled water and to this was added 1.16 mls of concentrated hydrochloric acid. The resulting product, consisting of fine solids suspended in a brown solution, was then added to the hot aqueous mixture derived from the anhydrides. An immediate fine grey-white precipitate formed, with a brownish residue at the base of the reaction flask. The flask was shaken vigorously while hot to mix the reactants together. The residue on cooling had the look and feel of beige chewing gum. The entire reaction mixture, including the aqueous solution, was then transferred to a PTFE lined pressure vessel, and the round-bottomed flask rinsed with 25 mls water, which was also transferred to a pressure vessel. After flushing the pressure vessel with nitrogen, this was then heated with stirring to 135° C. for 60 minutes and then to 180° C. for a further 150 minutes, reaching 130 psi during this time. After cooling overnight, the resulting brittle beige-yellow solid was ground and washed thoroughly with water.

The FTIR and $^1$H NMR spectra were comparable with those of the product made in organic solvent (IR (KBr): 2210 cm$^{-1}$ (alkyne), 1778 cm$^{-1}$ (imide C=O), 1718 cm$^{-1}$ (imide C=O), 1597 cm$^{-1}$, 1505 cm$^{-1}$, 1478 cm$^{-1}$, 1365 cm$^{-1}$, 1238 cm$^{-1}$, 1072 cm$^{-1}$, 837 cm$^{-1}$ and 741 cm$^{-1}$). The number average molecular weight ($M_n$) was 3832, and the weight-average molecular weight ($M_w$) was 8278, as determined by GPC in THF using polystyrene references for calibration.

Example 10

Into a PTFE lined pressure vessel was placed s-BPDA (1.9998 g), PEPA (0.3757 g), TPE-R (0.3314 g) and 3,4'-ODA (1.2865 g). To the solids was added approximately 60 mls of distilled water. After flushing the pressure vessel with nitrogen, the mixture was heated to 135° C. for 1 hour and then to 180° C. for a further 3 hours, reaching 110 psi during this time. After cooling overnight, the resulting yellow solid was ground and washed thoroughly with boiling water, methanol and acetone.

The reduced viscosity of the product after drying at 220° C./0.1 mm Hg for 20 minutes was 0.313 (1% solution in m-cresol at 30° C.). The yield was 3.351 g (97.1%). The FTIR spectrum was comparable with that of the product made in organic solvent (IR (KBr) 2210 cm$^{-1}$ (alkyne), 1775 cm$^{-1}$ (imide C=O), 1714 cm$^{-1}$ (imide C=O), 1593 cm$^{-1}$, 1505 cm$^{-1}$, 1486 cm$^{-1}$, 1367 cm$^{-1}$, 1234 cm$^{-1}$, 1088 cm$^{-1}$, 834 cm$^{-1}$ and 732 cm$^{-1}$). A transition at approx. 389° C. was observed using differential scanning calorimetry (DSC) on heating a sealed pan containing sample at a rate of 10° C./minute.

Example 11

In a round-bottomed flask was placed Ultem® dianhydride (3.896 g). To this was added solid NaOH (0.609 g) and approx. 40 mls of water. This mixture was heated to reflux for 90 minutes. In a separate beaker was placed N-allyloxy-(4-aminophthalimide) (0.435 g) and 2,4,6-trimethyl-1,3-benzenediamine (0.974 g). The solid was mixed with 40 mls distilled water and 1.50 mls of conc. HCl. Most of the solid dissolved, with some fine particles remaining in suspension. The mixture from the reaction of anhydride and water was placed in a PTFE lined pressure vessel, and the amine mixture was added to it, forming a sticky beige gum. After the pressure vessel was flushed with nitrogen, it was heated with stirring to 135° C. for 90 minutes and then to 180° C. for a further 150 minutes, reaching 120 psi during this time. After cooling overnight, the resulting brittle orange-beige solid was ground and washed thoroughly with boiling water.

The FTIR and $^1$H NMR spectra were comparable with those of the product made in organic solvent (IR (KBr) 1780 cm$^{-1}$ (imide C=O), 1722 cm$^{-1}$ (imide C=O), 1603 cm$^{-1}$, 1504 cm$^{-1}$, 1477 cm$^{-1}$, 1442 cm$^{-1}$, 1357 cm$^{-1}$, 1269 cm$^{-1}$, 1227 cm$^{-1}$, 1093 cm$^{-1}$, 1012 cm$^{-1}$, 841 cm$^{-1}$ and 748 cm$^{-1}$).

Example 12

In a three-necked round-bottomed flask under argon was placed 1,2,4,5-benzenetetracarboxylic acid (1.728 g) and PEPA (0.376 g). This mixture was suspended in 50 mls of water, and refluxed for 60 minutes. In a separate beaker was placed TPE-R (0.332 g) and 3,4'-ODA (1.286 g) and the mixture was dissolved in 20 mls water. The product mixture from the reaction of the acid and anhydride with water was transferred to a PTFE lined pressure vessel and the amine mixture was added to this under a stream of argon. A beige solid precipitated out. After the pressure vessel was flushed with argon it was heated to 130° C. for 90 minutes and then to 180° C. for a further 120 minutes, reaching 120 psi during this time. After cooling overnight, the resulting orange solid was ground and washed with boiling water, methanol and acetone, before being dried at 125° C./10mBar overnight.

The IR spectrum was measured (IR (KBr), 2211 cm$^{-1}$ (alkyne), 1779 cm$^{-1}$ (imide C=O), 1722 cm$^{-1}$ (imide C=O), 1593 cm$^{-1}$, 1504 cm$^{-1}$, 1489 cm$^{-1}$, 1378 cm$^{-1}$, 1239 cm$^{-1}$ 1119 cm$^{-1}$ 828 cm$^{-1}$ and 724 cm$^{-1}$). Two transitions at approx. 217° C. and 404° C. were observed using differential scanning calorimetry (DSC) on heating a sealed pan containing sample at a rate of 10° C./minute.

Example 13

Synthesis of high molecular weight polyimide (Ultem™ dianhydride/m-phenylene diamine polyimide) in water 1) Preparation of acid/amine complex:

Into a 500 ml round-bottomed flask equipped with stirrer bar, reflux condenser and nitrogen inlet and outlet was placed Ultem™ dianhydride (15.33 g, 0.02948 mole) and degassed distilled water (130 ml). The suspension was refluxed with stirring for 1 hour under a flow of nitrogen. Freshly crystallized and ground 1,3-benzene diamine (m-phenylene diamine) (3,24 g, 0.03 mole) was then added slowly to the mix with rapid stirring. The residue of the solid was washed into the flask with an extra 10 mls of distilled degassed water. After stirring at reflux for 5 minutes, the mixture was cooled to room temperature with stirring. The solid precipitate was collected on a sintered glass funnel, and then resuspended in fresh degassed distilled water (100 ml) using a Silverson mixer for 30 min.

2) Formation of polyimide:

The suspension of the solid in distilled water (100 ml) was transferred into a glass lined 600 mL Parr reactor, with a small amount of water (approx. 10 mls) being used to wash in the residue. After several cycles of evacuation and flushing with nitrogen gas to ensure the removal of oxygen from the system a positive pressure of nitrogen (10–15 psig,) was applied to the reactor. The reactor was heated to 135° C. for 1 hour with stirring. The temperature was then raised to 180° C. for a further 2 hours, again with stirring, the pressure at this stage being 150–160 psig.

The reaction is allowed to cool slowly to room temperature. The solid is collected in a sintered funnel and washed with distilled water. The solid was reduced to small particle size in a coffee grinder, stirred with boiling water and filtered. It was washed further with methanol, acetone and dichloromethane. After drying overnight at 125° C. under vacuum, the imide is dried at 220° C./0.1 mm Hg. Yield (14 g, 80%). The polymer could be further purified by dissolving in CH$_2$Cl$_2$ and re precipitating with light petroleum (80–100° C.).

$^1$H nmr 7.88, (d=8.5 Hz); 7.63–7.30, m; 7.03, d (J=8.5 Hz); 1.748, s. very similar to the commercial polyimide Ultem 1000 (General Electric).

FTIR ν cm$^{-1}$ 2970, 1777, 1723, 1604, 1499,1448, 1362, 1274, 1238, 1173, 1094, 1015, 848, 779, 739, and 627: identical to Ultem 1000. GPC in DMF: Mn 32474 cf Ultem 31889. Reduced viscosity: Ultem 0.31, product 0.35. DMTA on pressed plaque materials: Tg 213° C. cf 217° C. The tensile strength was 90.12 MPa at 4.04% strain (cf. manufacturer 105 MPa), and had a modulus of 3.294 GPa. Strain at break was 7%, modulus 3 GPa. The density was 1.25 g/mL cf 1.27 g/mL.

Example 14
Water synthesis of NASA material PETI-5.

The stoichiometry used was that reported by Hergenrother, P. M., Smith, J. G. Jr and Connell, J. W.

The method was identical to the procedure or example 13 except that the reactants were: s-BPDA (14.71 g), PEPA (2.45 g), 3,4'-ODA (9.35g) and 1,3-bis(3-diaminophenoxy) benzene (2.41 g). The yield was 21.5 g (79%) of a yellowish powder. FTIR $\nu$ cm$^{-1}$ 3062, 2206, 1775, (1740, 1728), 1591, 1506, 1487, 1369, 1239, 1094, 840, 737: identical with authentic PETI-5. By DMTA a slightly lower Tg of 255 cf 262° C. was observed. The reduced viscosity was 0.28 (1% in m-cresol at 300° C.).

Example 15
Large scale reactive acetyleno-end capped oligo-imide synthesis (2 Kg) in water 1) Preparation of acid/amine complex:

Into a 20L reactor with nitrogen inlet and outlet was placed 8.7 liter of distilled water and this was thoroughly outgassed. Then s-BPDA (760.6 g), 4,4'-oxydiphthalic anhydride (267.4 g) and PEPA (198.5 g) were gradually added to the well stirred degassed distilled water. The mixture was brought to reflux and then stirred for 2 hours under a flow of nitrogen. A further 3.3 liters of cold degassed water was added: the temperature was then about 80° C. A mixture of the two amines TPE-R (449.9 g) and 4-(4-aminophenoxyl) benzamine 4,4'-ODA (462.3 g) was then added slowly to the mix in portions with rapid stirring and the stirring continued at 80° C. for a further 30 min. This suspension was then allowed to cool to room temperature whilst maintaining the stirring. The solid precipitate was collected on a buchner funnel and the wet precipitate re-suspended in 6.7 liters of degassed water and stored in the refrigerator until the next day.

2) Formation of polyimide:

The stored precipitate in water was homogenized with a Silverson™ stirrer for 30 min. A nitrogen blanket was used over the solution during this treatment. After this treatment the suspension had a fluffy white "malted milk type" appearance and was transferred into the pressure reactor, with a small amount of degassed water. After carrying out several cycles of evacuation/flushing with nitrogen gas to ensure the removal of oxygen from the system, nitrogen was applied to the reactor so that there was a positive pressure of nitrogen of 10–15 psig. The reactor was heated to 135° C. for 1 hour with stirring. The temperature was then raised to 180° C. for a further 3 hours, again with stirring. The pressure by this stage was of the order of 150 psi. The steam tables predict a pressure of 146 psi absolute. It is important that stirring is maintained throughout the reaction.

The reaction was then allowed to cool slowly to room temperature. The solid is collected on a buchner funnel and washed with distilled water. It was then thoroughly ground in a mortar and pestle and refiltered before being washed with boiling water, then methanol, acetone and dichloromethane. After drying overnight at 125° C. under house vacuum, the imide was dried at 220° C./0.1 mm Hg. (Yield 1936 g, 97%). FTIR $\nu$ cm$^{-1}$ 3046, 2199, 1775, 1714, 1598, 1501, 1476, 1368, 1226, 1167, 1089, 963, 829, 736, 603, 508 (in excellent agreement with NMP-synthesized material). The reduced viscosity was 0.399 (1% cresol) cf. 0.423 for NMP synthesized material (1% in cresol). The Tg on curing was 260° C. cf. 260° C. The total volatiles after heating at 200° C. for 1 h at 0.8 mmHg were 0.17%, and the free amine was <0.01%.

Example 16
Water synthesis of a Methylnadimide end-capped oligomer

Ultem dianhydride (25.73 g) and methylnadic anhydride (methyl norbornene-2,3-dicarboxylic anhydride, 2.97 g) were placed in a 500 ml flask with degassed distilled H$_2$O (100 ml). The mixture was refluxed with stirring for 1 h under a flow of nitrogen. 2,4,6-Trimethyl-1,3-diaminobenzene (8.05 g) was added slowly to the mixture with rapid stirring. Then the procedure described in example 13 was followed. The yield was 30.0 g (90%) of an off-white powder. The $^1$H nmr spectrum was similar to a reference material made by conventional means in cresol, excepting that the functionality was higher in the water method. FTIR $\nu$ cm$^{-1}$ 2967, 1777, 1721, 1607, 1504, 1477, 1445, 1363, 1272, 1236, 1175, 1104, 1081, 1015, 949, 850, 751, 739 comparable to the same oligomer made by a method using cresol as solvent. A glass transition was observed at 250° C., with another transition at 374° C.

Example 17
Water synthesis of 3,6-Endoxo-1,2,3,6-tetrahydrophthalimido end capped oligoimide The method was identical to the procedure of example 16 except that the reactants were.

Ultem dianhydride (25.73 g) and 3,6-endoxo-1,2,3,6-tetrahydrophthalic anhydride.

Example 18
Typical curing of the neat resin

The solid yellow product of Example 7 was ground to a powder and placed in an aluminium mould. This mould was then heated to 320° C. over 30 minutes, maintained at this temperature for 1 hour, then heated to 380° C. for three hours. A dark-brown solid plaque was produced.

A transition at 273° C. was observed using differential scanning calorimetry (DSC) on heating a sealed pan containing sample at a rate of 10° C./minute.

Example 19
Preparation of a Composite

A solid compound produced using the method of Example 9 was ground and dried completely by heating under a vacuum of <1 mm for 30 min at 220° C. The powder was dissolved in CH$_2$Cl$_2$ (15 g/50 ml) and painted onto SP Systems RC200P plain weave carbon fibre cloth at an application rate of 1.1 g of resin per g of cloth. After drying in an a warm air flow for 60 min, the prepreg was heated for 2 min at 110° C. The prepreg was dry and boardy but could be laid up into 5 ply laminates. The five-ply coupon was cured in the hot press by first heating for 1 h at 340° C., followed by 3 h at 360° C. Excellent consolidation was achieved by applying 50 psi pressure on the platens after heating for 20 min at 340° C. Microscopy on a polished section of this laminate showed it to be completely free of voids. The glass transition was determined by DMTA to be 225° C. (tan δ peak at 1 Hz).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications which fall within its spirit and scope. The invention also includes all the steps, features, compositions and compounds referred to or indicated in this specification, individually or collectively, and any and all combinations of any two or more of said steps or features.

What is claimed is:

1. A process for the preparation of an oligomeric polyimide comprising:

mixing a tetracarboxylic acid, a dianhydride, a partially hydrolysed dianhydride or a mixture thereof with a diamine in a reaction medium comprising greater than 80% by weight water, and heating mixture in said reaction medium at a temperature above 100° C. for a time sufficient to form said oligomeric polyimide.

2. A process according to claim 1 wherein the tetracarboxylic acid, dianhydride or partially hydrolysed dianhydride is selected from tetracarboxylic acids of formula (I) and dianhydrides of formula (II), partially hydrolysed anhydrides of formula (II), or mixtures thereof;

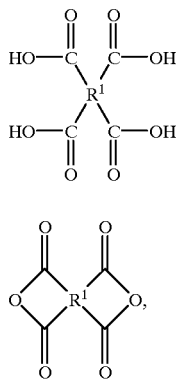

where $R^1$ is selected from optionally substituted alkyl, optionally substituted aryl and optionally substituted bridged or bonded di- or poly-aryl.

3. A process according to claim 2 wherein $R^1$ is an optionally substituted aryl group containing between 5 and 20 ring atoms.

4. A process according to claim 3 wherein the aryl group is derived from benzene, naphthalene, anthracene, phenanthracene, carbazole, indene, pyrene, pyridine, pyrazine, indole, isoquinoline, naphthyridine, xanthene, acridine, phenanthroline, phenazine, each of which may be optionally substituted.

5. A process according to claim 2 wherein $R^1$ is an optionally substituted bridged or bonded di- or poly-aryl group.

6. A process according to claim 5 wherein R1 represents two optionally substituted aryl groups connected via a bridging group, the bridging group being selected from —CO—, —CO$_2$—, —CONH—, —SO$_2$—, —SO—, —O—, —S—, —S—S—, —(CH$_2$)$_m$— where m is 1 to 4, —CH(OH)—, —C(CF$_3$)$_2$—, —C(CH$_3$)$_3$—, —PR(O)—,

—PO$_3$R—,

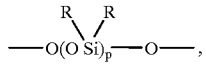

where p is 1 to 25,

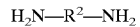

where q is 1 to 10, or a group of the formula —(X)$_n$L(Y)$_o$—where L is an optionally substituted aryl group, X and Y are independently selected from O, S, —CH$_2$—, —SO$_2$—and —CO—, and n and or are independently 0 or 1, where each R is independently selected from optionally substituted alkyl or optionally substituted aryl.

7. A process according to claim 6 wherein $R^1$ is selected from biphenyl, phenoxybenzene, diphenylketone and sulphonyldiphenyl.

8. A process according to claim 1 or claim 2 wherein the diamnine is a compound of formula III $$H_2N-R^2-NH_2 \qquad \text{III}$$

where $R^2$ is selected from optionally substituted alkylene, optionally substituted siloxane, optionally substituted arylene and optionally substituted bridged or bonded di- or polyaryl.

9. A process according to claim 8 wherein $R^2$ is an optionally substituted arylene group containing between 5 and 20 ring atoms.

10. A process according to claim 9 wherein the arylene group is derived from benzene, naphthalene, anthracene, phenanthracene, carbazole indene, pyrene, pyridine, pyrazine, indole, isoquinoline, naphthyridine, xanthene, acridine, phenanthroline, phenazine, each of which may be optionally substituted.

11. A process according to claim 8 wherein $R^2$ is an alkylene group selected from

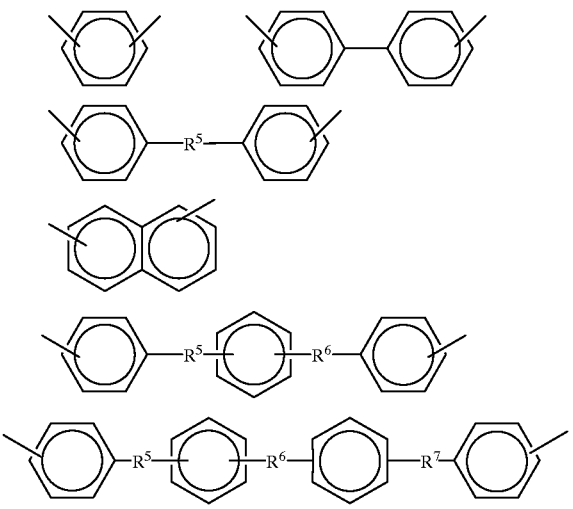

wherein $R^5$, $R^6$ and $R^7$ are bridging groups.

12. A process according to claim 11 wherein the bridging group being selected from —CO—, —CO$_2$—, —CONH—, —SO$_2$—, —SO—, —O—, —S—, —S—S—, —(CH$_2$)$_m$—

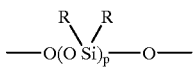

where m is 1 to 4, —CH(OH)—, —C(CF$_3$)$_2$—, —C(CH$_3$)$_3$—, —PR(O)—, —PO$_3$R—,

where p is 1 to 25,

where q is 1 to 10, or a group of the formula —(X)$_n$L(Y)$_o$—where L is an optionally substituted aryl group, X and Y are independently selected from O, S, —CH$_2$—, —SO$_2$— and —CO—, and n and or are independently 0 or 1, where each R is independently selected from optionally substituted alkyl or optionally substituted aryl.

13. A process according to claim 1 wherein the diamine is selected from meta-phenylene diamine; 2,2-bis(4-aminophenyl) propane; 4,4'-diamino diphenyl methane; 4,4'-diamino diphenyl sulfide; 4,4'-diamino diphenyl sulfone; 3,3'-diamino-diphenyl sulfone; 4,4'-oxydianiline; bis-(4-aminophenyl) diethylsilane; bis-(4-aminophenyl) diphenylsilane; 3,3'-dichlorobenzidine; 3,3'direthoxy benzidine; bis-(4-aminophenyl) ethyl phosphine oxide; bis-(4-aminophenyl) phenyl phosphine oxide; bis-(4-aminophenyl)-n-butylamine; bis-(4-aminophenyl) methylamine; 1,5-diamino naphthalene; 3,3-dimethyl-4,4'-diaminobiphenyl; N-(3-aminophenyl)4-aminobenzamide; 4-aminophenyl-3-aminobenzoate; bisaniline M-(4,4'-[1,3-phenylene bis(1-methylethylidene)]-bis(benzenamine); bisaniline P (4,4'-[1,4-phenylene bis(1-methyethylidene)]-bis(benzenamine); 3,3'-diaminobenzophenone; 2,2-bis(3-amino-4-methylphenyl)hexafluoropropane; 4,4'-bis(4-aminophenoxy)biphenyl; and mixtures thereof.

14. A process according to claim 1 or claim 2 wherein the reaction medium contains less than 10% by weight cosolvents and additives.

15. A process according to claim 3 wherein the reaction medium contains less than 5% by weight cosolvents and additives.

16. A process according to claim 3 wherein the reaction medium is substantially free of cosolvents and additives.

17. A process according to claim 1 or claim 2 wherein the ratio of the number of moles of NH$_2$ groups to the number of moles of C=O derived from carboxylic acids or anhydrides in the total mix is about 1:2.

18. A process according to claim 1 or claim 2 wherein the ratio of the number of moles of NH$_2$ groups to the number of moles of C=O derived from carboxylic acids or anhydrides in the total mix is greater than 1:2.

19. A process according to claim 1 or claim 2 wherein the respective ends of the oligomeric polyimide are capped by reaction with an appropriate capping compound.

20. A process according to claim 19 wherein the capping compound is added to the mixture during the mixing stage.

21. A process according to claim 19 wherein the capping compound is added to the mixture during the heating stage.

22. A process according to claim 19 wherein the capping compound is added after formation of the polyimide.

23. A process according to claim 1 or claim 2 wherein the oligomeric polyimide is of formula IV:

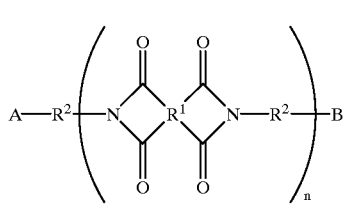

wherein R$^1$ and R$^2$ are as defined above, n is greater than 1, and A and B may be the same or different and represent suitable end groups.

24. A process of claim 23 wherein A and B are independently selected from:

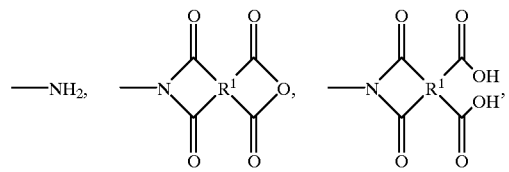

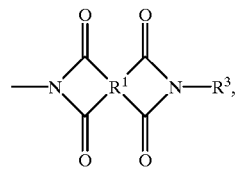

where R$^3$ is a monovalent organic radical, or an imidic structure:

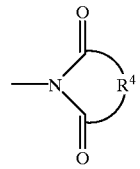

where R$^4$ is a divalent organic radical.

25. A prcess of claim 24 wherein R$^3$ is selected from optionally substituted alkyl, optionally substituted alkenyl, optionally substituted alkynyl, optionally substituted aryl, optionally bridged or bonded di or polyaryl, optionally substituted alkoxy, optionally substituted alkenyloxy, and optionally substituted alkynyloxy.

26. A process according to claim 27 wherein A and B are independently selected from

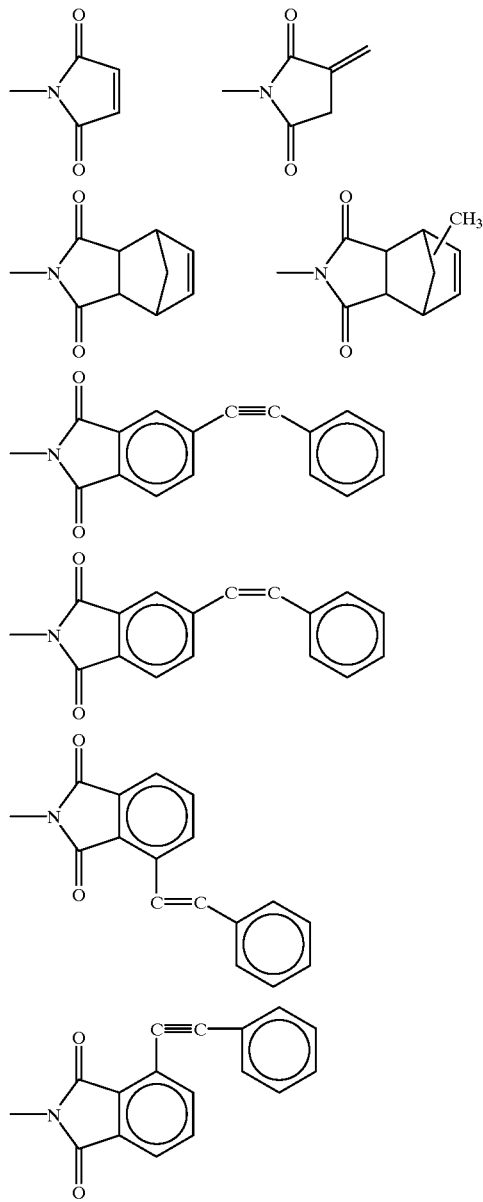

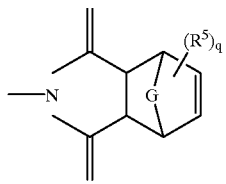

where $R^5$ is as defined above, G is O, S, —$SO_2$—, —SO, —CO—, —S—S—, or optionally substituted methylene, and q is 0, 1, 2, 3 or 4;

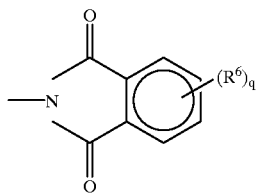

where q is as defined above and $R^6$ is the same or different and is selected from optionally substituted $C_1$–$C_6$ alkyl, optionally substituted $C_2$–$C_6$ alkene, optionally substituted $C_2$–$C_6$ alkyne, $C_1$–$C_6$ alkoxy, optionally substituted aryl or aryloxy, optionally substituted bridged or bonded di or polyaryl;

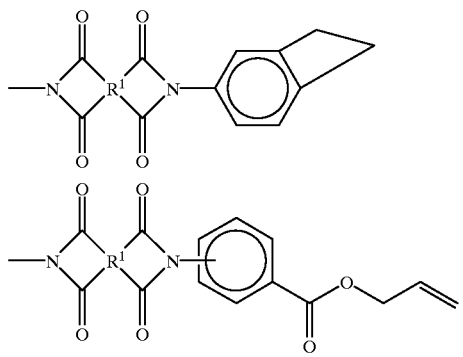

27. A process according to claim 23 wherein A and B are independently selected from

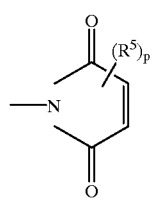

where each $R^5$ is the same or different and is selected from optionally substituted $C_1$–$C_6$ alkyl, optionally substituted $C_2$–$C_6$ alkene, optionally substituted $C_2$–$C_6$ alkyne, $C_1$–$C_6$ alkoxy, optionally substituted aryl or aryloxy and p is 0,1 or 2;

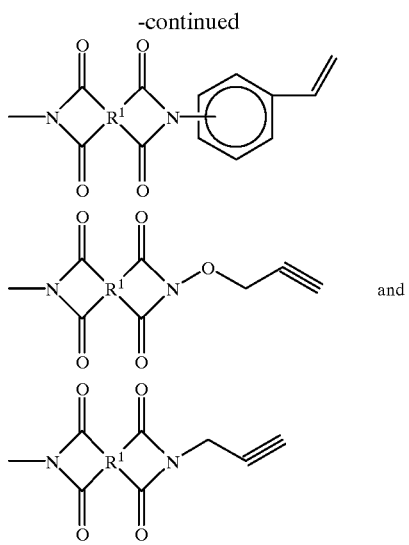

28. A process according to claim 23 wherein R⁴ is selected from optionally substituted alkynyl, optionally substituted alkenylene, optionally substituted arylene and optionally substituted bridged or bonded di or polyaryl.

29. A process according to claim 1 or claim 2 wherein the mixing step is conducted at the atmospheric pressure at the boiling point of the reaction medium.

30. A process according to claim 1 or claim 2 wherein the mixing step is conducted until formation of an insoluble intermediate product.

31. A process according to claim 30 wherein the intermediate product is heated under pressure in the reaction medium in which it formed, to form the oligomeric polyimide.

32. A process according to claim 1 or claim 2 wherein the tetracarboxylic acid, dianhydride, partially hydrolysed dianhydride or mixture thereof is added to at least part of the reaction medium prior to the addition of the diamine.

33. A process according to claim 32 wherein a suspension or solution of diamine in a part of the reaction medium is separately prepared before addition to the mixture of the tetracarboxylic acid, dianhydride, partially hydrolysed dianhydride, partially hydrolysed dianhydride components and the rest of the reaction medium.

34. A process according to claim 19 wherein the capping compound is 4-(phenylethynyl)-1,2-benzenedicarboxylic acid anhydride.

35. A process according to claim 1 or claim 2 wherein the dianhydride is 2,2-bis[3,4-dicarboxyphenoxy)phenyl] propane dianhydride.

36. A process according to claim 1 or claim 2 wherein the mixing step comprises mixing symmetrical biphenyl anhydride, 4-(phenylethynyl)-1,2-benzenedicarboxylic acid anhydride, 3-(4-aminophenoxy) benzenamine, and 1,3-bis(3-diaminophenoxy) benzene in the reaction medium.

37. A process according to claim 1 or claim 2 wherein the mixing step comprises mixing symmetrical biphenyl dianhydride, 4',4-oxydiphthalic anhydride and 4-(phenylethynyl)-1,2-benzene dicarboxylic acid anhydride in the reaction medium and treating to boiling to produce a first intermediate product, and adding a mixture of the two amines TPE-R and 4-(4-amino phenoxyl) benzamine 4,4'-ODA, optionally together with further reaction medium, and mixing to produce a second intermediate product.

38. A curable composition comprising an oligomeric polyimide prepared in accordance with the process of claim 1 or claim 2.

39. An impregnated fibre reinforced material wherein the fibre reinforcements are impregnated with a curable composition according to claim 38.

40. A composite material comprising a fibrous material in a matrix of a cured resin composition according to claim 38.

* * * * *